US 12,027,889 B2

(12) United States Patent
Hashimoto et al.

(10) Patent No.: US 12,027,889 B2
(45) Date of Patent: Jul. 2, 2024

(54) OPERATING STATE JUDGMENT APPARATUS AND WIRELESS POWER TRANSFER SYSTEM

(71) Applicant: TOYOTA JIDOSHA KABUSHIKI KAISHA, Aichi-ken (JP)

(72) Inventors: Toshiya Hashimoto, Miyoshi (JP); Daiki Yokoyama, Gotemba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 262 days.

(21) Appl. No.: 17/740,365

(22) Filed: May 10, 2022

(65) Prior Publication Data

US 2022/0368174 A1   Nov. 17, 2022

(30) Foreign Application Priority Data

May 14, 2021   (JP) ................. 2021-082468

(51) Int. Cl.
| | |
|---|---|
| *H02J 50/90* | (2016.01) |
| *H02J 50/12* | (2016.01) |
| *H02J 50/40* | (2016.01) |
| *B60L 53/12* | (2019.01) |
| *B60L 53/30* | (2019.01) |
| *B60L 53/60* | (2019.01) |
| *H02J 50/60* | (2016.01) |

(52) U.S. Cl.
CPC ............ *H02J 50/90* (2016.02); *H02J 50/12* (2016.02); *H02J 50/40* (2016.02); *B60L 53/12* (2019.02); *B60L 53/30* (2019.02); *B60L 53/60* (2019.02); *H02J 50/60* (2016.02)

(58) Field of Classification Search
CPC .. H02J 50/90; H02J 50/12; H02J 50/40; H02J 50/60; B60L 53/12; B60L 53/30; B60L 53/60
See application file for complete search history.

(56) References Cited

U.S. PATENT DOCUMENTS

| | | | | |
|---|---|---|---|---|
| 9,991,741 | B1 * | 6/2018 | Bell ................... | H02J 7/00034 |
| 10,985,617 | B1 * | 4/2021 | Johnston ............... | H02J 50/005 |
| 11,113,956 | B1 * | 9/2021 | Gunter ................. | G01N 27/121 |
| 2004/0025496 | A1 * | 2/2004 | Patterson, Jr. ....... | G01R 31/085 |
| | | | | 60/254 |

(Continued)

FOREIGN PATENT DOCUMENTS

JP   2010167898 A   8/2010

*Primary Examiner* — Daniel Kessie
*Assistant Examiner* — Brian K Baxter
(74) *Attorney, Agent, or Firm* — HAUPTMAN HAM, LLP (57) ABSTRACT

The processing part is configured to calculate an elapsed time from an inspection date or installation date of a power transmission apparatus installed at a location of occurrence of an abnormality to a date of occurrence of an abnormality based on the inspection information and information on occurrence of an abnormality relating to the location of occurrence of an abnormality and date of occurrence of the abnormality where the power transfer efficiency from the power transmission apparatus to the power reception apparatus received from the mobile object through the communication part becomes less than a predetermined value, and is configured to judge an operating state of the power reception apparatus based on the elapsed time.

3 Claims, 5 Drawing Sheets

(56) References Cited

U.S. PATENT DOCUMENTS

| | | | | |
|---|---|---|---|---|
| 2009/0315510 A1* | 12/2009 | Dos Santos | .............. | H02J 50/80 |
| | | | | 320/165 |
| 2010/0327766 A1* | 12/2010 | Recker | ................. | H02J 7/0029 |
| | | | | 362/20 |
| 2016/0356860 A1* | 12/2016 | Zeine | ....................... | H02J 50/40 |
| 2017/0288470 A1* | 10/2017 | Shirani-Mehr | ..... | H02J 7/00034 |
| 2017/0288471 A1* | 10/2017 | Shirani-Mehr | ..... | H02J 7/00034 |
| 2017/0368944 A1* | 12/2017 | Huang | ................... | B60L 53/65 |
| 2017/0373544 A1* | 12/2017 | Niizuma | ................. | B60L 50/60 |
| 2018/0241255 A1* | 8/2018 | Leabman | ................. | H04B 1/04 |
| 2018/0375367 A1* | 12/2018 | Saita | ....................... | B60L 53/66 |
| 2019/0084434 A1* | 3/2019 | Yoshizaki | ............... | B60L 53/60 |
| 2019/0094286 A1* | 3/2019 | Becher | ................. | G01R 31/085 |
| 2019/0288567 A1* | 9/2019 | Kabiri | .................... | H01Q 21/28 |
| 2020/0076238 A1* | 3/2020 | Asanuma | ................ | H02J 50/20 |
| 2020/0139138 A1* | 5/2020 | Sit | ............................ | A61N 1/05 |
| 2020/0148139 A1* | 5/2020 | Nakao | ................... | H02J 7/0029 |
| 2020/0244374 A1* | 7/2020 | Alpert | ....................... | H02J 7/02 |
| 2022/0052558 A1* | 2/2022 | Nakao | ..................... | H02J 50/12 |
| 2022/0102995 A1* | 3/2022 | Fieldbinder | ............. | H02J 50/12 |
| 2023/0339496 A1* | 10/2023 | Yamashita | ........... | G06Q 10/047 |
| 2024/0027541 A1* | 1/2024 | Kato | ....................... | B60L 53/12 |

* cited by examiner

OPERATING STATE JUDGMENT APPARATUS AND WIRELESS POWER TRANSFER SYSTEM

RELATED APPLICATIONS

The present application claims priority of Japanese Patent Application No. 2021-082468 filed May 14, 2021, the disclosure of which is hereby incorporated by reference herein in its entirety.

FIELD

The present disclosure relates to an operating state judgment apparatus and wireless power transfer system.

BACKGROUND

Japanese Unexamined Patent Publication No. 2010-167898 discloses a vehicle configured to enable charging of a battery by dynamic wireless power transfer.

SUMMARY

When an abnormality occurs in power transfer from a power transmission apparatus to a power reception apparatus, a dynamic wireless power transfer system has to judge if the cause of the abnormality lies in the power transmission apparatus installed on the road or if it lies in the power reception apparatus mounted in a vehicle. In particular, if an abnormality occurs in the power reception apparatus, power is liable to be unable to be transferred to the vehicle mounting the power reception apparatus in which the abnormality has occurred or even if able to be transferred, the amount of power transfer is liable to decrease from normal times and running of the vehicle is liable to be obstructed. Therefore, if an abnormality occurs in the power transfer from a power transmission apparatus to a power reception apparatus, it is desirable to judge the operating state of the power reception apparatus.

The present disclosure was made focusing on such a problem and has as its object to judge an operating state of a power reception apparatus in the case where an abnormality has occurred in power transfer from a power transmission apparatus to a power reception apparatus.

To solve the above problem, an operating state judgment apparatus according to one aspect of the present disclosure comprises a processor, a communication device configured to be able to communicate with a mobile object provided with a power reception apparatus for receiving power wirelessly transmitted from a power transmission apparatus installed on a road, and a storage device configured to store inspection information relating to inspection dates or installation dates of power transmission apparatuses. The processor is configured to calculate an elapsed time from an inspection date or installation date of a power transmission apparatus installed at a location of occurrence of an abnormality based on the inspection information and information on occurrence of an abnormality relating to the location of occurrence of the abnormality and date of occurrence of the abnormality where the power transfer efficiency from the power transmission apparatus to the power reception apparatus received from the mobile object through the communication device becomes less than a predetermined value, and judge an operating state of the power reception apparatus based on the elapsed time.

Further, a wireless power transfer system according to one aspect of the present disclosure comprises a mobile object provided with a power reception apparatus for receiving power wirelessly transmitted from a power transmission apparatus installed on a road, and a server in which inspection information relating to inspection dates or installation dates of power transmission apparatuses is stored. The mobile is configured to detect a location of occurrence of an abnormality and date of occurrence of the abnormality at which a power transfer efficiency from the power transmission apparatus to the power reception apparatus has become less than a predetermined value and transmit information relating to the location of occurrence of the abnormality and the date of occurrence of the abnormality to the server. The server is configured to calculate an elapsed time from the inspection date or installation date of the power transmission apparatus installed at the location of occurrence of the abnormality to a date of occurrence of an abnormality based on the inspection information and information on occurrence of an abnormality received from the mobile and judge an operating state of the power reception apparatus based on the elapsed time.

According to these aspects of the present disclosure, if an abnormality has occurred in power transfer from a power transmission apparatus to the power reception apparatus in a predetermined time period from a date of inspection or date of installation of the power transmission apparatus, it is possible to make use of the property of the higher possibility of an abnormality occurring in the power reception apparatus rather than the power transmission apparatus so as to judge the state of the power reception apparatus.

DESCRIPTION OF EMBODIMENTS

Below, referring to the drawings, embodiments of the present disclosure will be explained in detail. Note that, in the following explanation, similar component elements will be assigned the same reference notations.

Figure 1:
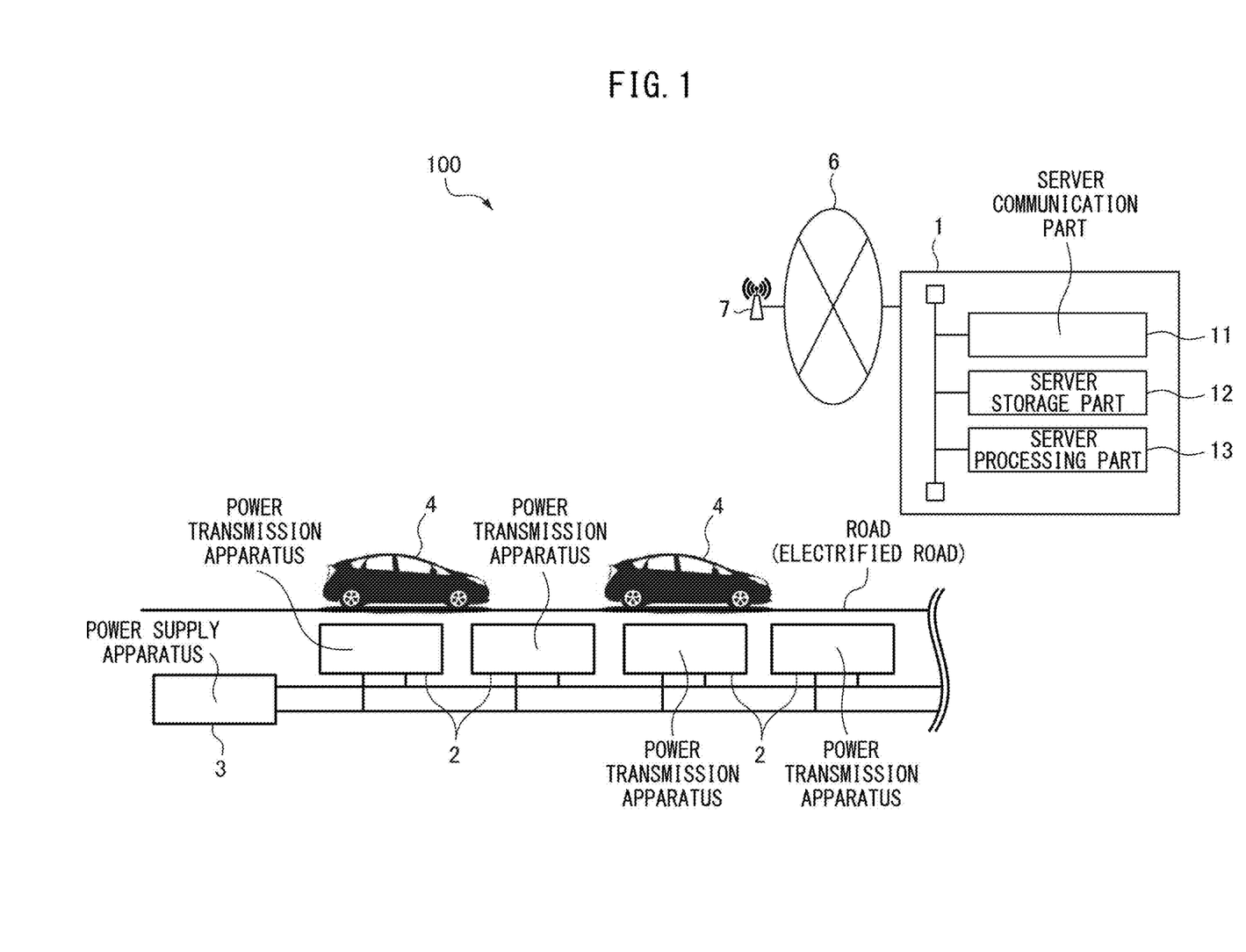
FIG. 1 is a schematic view of the configuration of a dynamic wireless power transfer system according to one embodiment of the present disclosure.

FIG. 1 is a schematic view of the configuration of a dynamic wireless power transfer system 100 according to one embodiment of the present disclosure.

The dynamic wireless power transfer system 100 according to the present embodiment is provided with a server 1, a plurality of power transmission apparatuses 2 installed consecutively along a road at predetermined intervals, a power supply apparatus 3 for supplying power to the power transmission apparatuses 2, and a plurality of vehicles 4 in which power reception apparatuses (see FIG. 2) are mounted for receiving power wirelessly transmitted from the power transmission apparatuses 2. The vehicles 4 may be electric vehicles, may be hybrid vehicles, or may be so-called engine vehicles. The type is not particularly limited. Note that, in the following explanation, a road in which power transmission apparatuses 2 are installed will be referred to as an "electrified road" in accordance with need.

The server 1 is provided with a server communicating part 11, server storage part 12, and server processing part 13.

The server communicating part 11 has a communication interface circuit for connecting the server 1 through, for example, a gateway etc. to a network 6 and is configured to be enable communication with the vehicle 4.

The server storage part 12 has an HDD (hard disk drive) or optical recording medium, semiconductor memory, or other storage medium and stores various types of computer programs or data etc. used for processing at the server processing part 13.

The server processing part 13 has one or more CPU (central processing units) and their peripheral circuits. The server processing part 13 runs various types of computer programs stored in the server storage part 12 and controls overall the operations of the server 1 as a whole. For example, it is a processor. The processing performed by the server processing part 13 and in turn the server 1 will be explained referring to FIG. 3 to FIG. 6.

Figure 2:
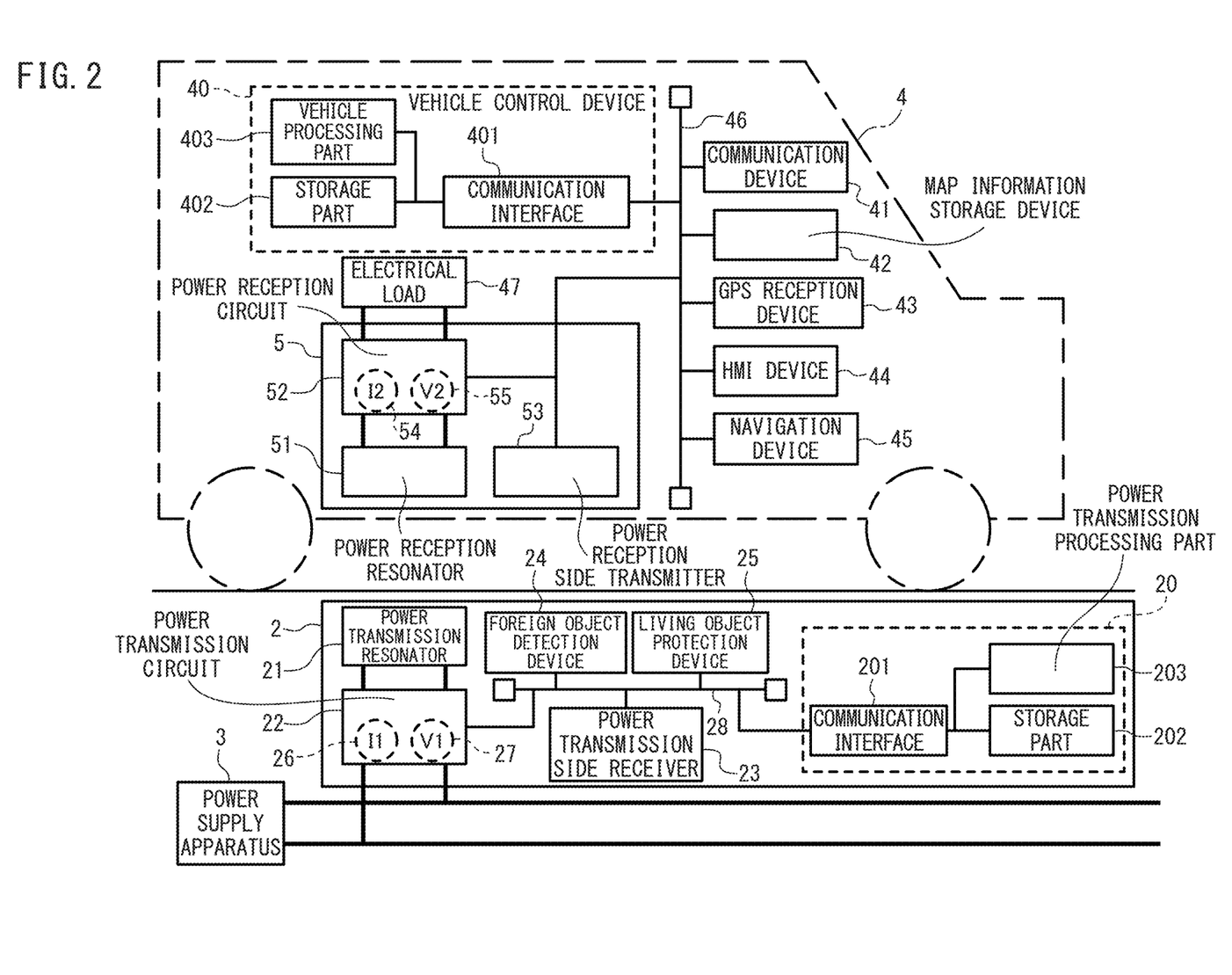
FIG. 2 is a view explaining the detailed configurations of a power transmission apparatus and a vehicle according to an embodiment of the present disclosure.

FIG. 2 is a view explaining the detailed configurations of a power transmission apparatus 2 and a vehicle 4 according to an embodiment of the present disclosure.

The power transmission apparatus 2 is provided with a power transmission resonator 21, a power transmission circuit 22, a power transmission side receiver 23, a foreign object detection device 24, a living object protection device 25, and a power transmission control device 20. The power transmission circuit 22, power transmission side receiver 23, foreign object detection device 24, and living object protection device 25 are connected with the power transmission control device 20 through an internal network 28 in the power transmission apparatus 2 based on the CAN (Controller Area Network) or other standard.

The power transmission resonator 21 is a resonance circuit including a power transmission coil and is configured to resonate at a predetermined resonance frequency $f_0$. The vehicle 4 is provided with a power reception resonator 51 corresponding to this power transmission resonator 21. The power reception resonator 51 is a resonance circuit including a power reception coil and is configured to resonate by the same resonance frequency $f_0$ as the power transmission resonator 21. By making the power transmission resonator 21 resonate, a spatially separately arranged power transmission coil of the power transmission resonator 21 and power reception coil of the power reception resonator 51 are magnetically coupled and power is transferred (wirelessly supplied) from the power transmission apparatus 2 to the power reception apparatus 5.

The power transmission circuit 22 is an electrical circuit provided with an inverter and is configured to convert DC power supplied from the power supply apparatus 3 to the desired AC power and supply it to the power transmission resonator 21 based on a control signal from the power transmission control device 20. The power transmission circuit 22 is provided with a power transmission side current sensor 26 for detecting a current I1 flowing through the power transmission resonator 21 (below, referred to as the "power transmission side current") and a power transmission side voltage sensor 27 for detecting a voltage V1 applied to the power transmission resonator 21 (below, referred to as the "power transmission side voltage"). The power transmission side current I1 and the power transmission side voltage V1 detected by the sensors 26 and 27 are respectively input to the power transmission control device 20.

The power transmission side receiver 23 utilizes a predetermined wireless communication line to wirelessly communicate with a power reception side transmitter 53 mounted in each vehicle 4 and receives a proximity signal sent from the power reception side transmitter 53. A proximity signal is a signal for notifying the approach of the vehicle 4 to a power transmission apparatus 2 and a signal for prompting the power transmission apparatus 2 receiving the proximity signal to prepare for transfer of power.

The foreign object detection device 24 detects metal foreign objects present on the road between the power transmission apparatus 2 and power reception apparatus 5. This is because if power is transferred from the power transmission apparatus 2 to the power reception apparatus 5 in a state where there is a metal foreign object present in the space between the power transmission apparatus 2 and the power reception apparatus 5, the metal foreign object is liable to be heated and the power transfer efficiency is liable to fall. The foreign object detection device 24 sends foreign object detection information on whether there is a metal foreign object present to the power transmission control device 20 in response to a request from the power transmission control device 20. The method of detection of a metal foreign object by the foreign object detection device 24 is not particularly limited. For example, detection by a metal detector or other various known techniques can be used.

The living object protection device 25 detects any living object (for example, a human being or animal etc.) present in the surroundings of the power transmission apparatus 2. This is because if the power transmission apparatus 2 is driven in a state where there is a living object present in the surroundings of the power transmission apparatus 2, the living body will be exposed to the magnetic field leaked from the power transmission apparatus 2 and is liable to be affected in health. The living object protection device 25 sends living object detection information on whether there is a living object present to the power transmission control device 20 in response to a request from the power transmission control device 20. The method of detection of a living object by the living object detection device 25 is not particularly limited. For example, image recognition or other various known techniques can be used.

The power transmission control device 20 is provided with a communication interface 201, storage part 202, and power transmission processing part 203.

The communication interface 201 is a communication interface circuit for connecting the power transmission control device 20 to the internal network 28 in the power transmission apparatus 2.

The storage part 202 has an HDD or optical recording medium, semiconductor memory, or other storage medium and stores various computer programs or data etc. used for processing in the power transmission processing part 203.

The power transmission processing part 203 has one or more processors and their peripheral circuits. The power transmission processing part 203 runs various computer programs stored in the storage part 202 to comprehensively control the power transmission apparatus 2 and is, for example, a CPU.

If for example receiving a proximity signal through the power transmission side receiver 23, the power transmission processing part 203 and in turn the power transmission control device 20 drive the foreign object detection device 24 and living object protection device 25 to acquire foreign object detection information and living object detection information. Further, if the presence of at least one of a metal foreign object or living object is confirmed, the power transmission control device 20 controls the power transmission circuit 22 so that power is transferred from the power transmission apparatus 2 to the power reception apparatus 5. On the other hand, if the presence of a metal foreign object and living object is not confirmed, the power transmission control device 20 controls the power transmission circuit 22 so that the transmitted power P1 [W] becomes a predetermined target power transmission power $P1_{tgt}$.

In the present embodiment, the target power transmission power $P1_{tgt}$ is made a preset fixed value, but, for example, if the proximity signal is made to include information relating to the demanded received power of the sending vehicle 4 of the proximity signal, the target power transmission power $P1_{tgt}$ may also be set to the demanded received power.

Note that the power transmission side current I1 is correlated with an engagement coefficient "k" showing a degree of magnetic engagement between a power transmission coil of a power transmission resonator 21 and a power reception coil of a power reception resonator 51. The smaller the engagement coefficient "k", the larger it becomes. Therefore, for example, by monitoring the power transmission side current I1 after receiving the proximity signal, it is possible to judge approach and separation of the vehicle 4 with respect to the power transmission apparatus 2 and possible to start or end control with respect to the power transmission circuit 22 in accordance with that judgment.

The vehicle 4 is provided with a communication device 41, map information storage device 42, GPS reception device 43, HMI device 44, navigation device 45, power reception apparatus 5, and vehicle control device 40. The communication device 41, map information storage device 42, GPS reception device 43, HMI device 44, navigation device 45, and power reception apparatus 5 are connected with the vehicle control device 40 through an internal vehicle network 46 based on the CAN or other standard.

The communication device 41 is a vehicle-mounted terminal having a wireless communication function. The communication device 41 accesses a wireless base station 7 (see FIG. 1) connected with a network 6 (see FIG. 1) through a not shown gateway etc. so as to be connected with the network 6 through the wireless base station 7. Due to this, the vehicle 4 and the server 1 communicate with each other.

The map information storage device 42 stores map information including positional information of the road or information relating to the type of the road (for example, information of whether the road is an electrified road etc.)

The GPS reception device 43 receives signals from satellites to identify the latitude and longitude of the host vehicle 4 and detect the current position of the host vehicle 4. The GPS reception device 43 sends the detected current position information of the host vehicle 4 to the vehicle control device 40.

The HMI device 44 is an interface for transfer of information with a vehicle occupant. The HMI device 44 according to the present embodiment is provided with a display or speaker for providing various information to the vehicle occupants and a touch panel (or operating buttons) for the vehicle occupants to input information. The HMI device 44 sends input information input by the vehicle occupants to various devices requiring that input information (for example, a navigation device if the input information is the destination) and displays the information received through the internal vehicle network 46 on the display to provide it to the vehicle occupants.

The navigation device 45 is a device for guiding the vehicle 4 to a destination set by the vehicle occupants through the HMI device 44. For example, the navigation device 45 sets a driving route to the destination based on the current position information of the host vehicle 4 and map information and sends the information relating to the set driving route as navigation information to the vehicle control device 40 or HMI device 44 etc.

The power reception apparatus 5 is provided with a power reception resonator 51, power reception circuit 52, and power reception side transmitter 53.

The power reception resonator 51, as explained above, is a resonance circuit including a power reception coil and is configured to resonate at the same resonance frequency $f_0$ as the power transmission resonator 21.

The power reception circuit 52 is an electrical circuit provided with a rectifier and DC/DC converter and is configured to be able to convert AC power output from the power reception resonator 51 by the rectifier to DC power and supply it through the DC/DC converter to an electrical load 47. As the electrical load 47, for example, a battery, motor, etc. may be mentioned, but it is not particularly limited. In the present embodiment, the power reception circuit 52 is connected to a battery as the electrical load 47. The power reception circuit 52 is provided with a power reception side current sensor 54 for detecting an output current I2 of the rectifier (below, referred to as the "power reception side current") and a power reception side voltage sensor 55 for detecting an output voltage V2 of the rectifier (below, referred to as the "power reception side voltage"). The power reception side current I2 and power reception side voltage V2 detected by the sensors 54 and 55 are respectively input to the vehicle control device 40.

The power reception side transmitter 53 utilizes a predetermined wireless communication line to wirelessly communicate with the power transmission side receiver 23 of each power transmission apparatus 2 and sends the above-mentioned proximity signal to each power transmission apparatus 2.

The vehicle control device 40 is provided with a communication interface 401, storage part 402, and vehicle processing part 403.

The communication interface 401 is a communication interface circuit for connecting the vehicle control device 40 to the internal vehicle network 46.

The storage part 402 has an HDD or optical recording medium, semiconductor memory, or other storage medium and stores various computer programs or data etc. used for processing in the vehicle processing part 403.

The vehicle processing part 403 has one or more processors and their peripheral circuits. The vehicle processing part 403 runs various types of computer programs stored in the storage part 402 and controls overall the vehicle 4. For example, it is a CPU.

If detecting for example that the host vehicle 4 is approaching an electrified road, the vehicle processing part 403 and in turn the vehicle control device 40 start to send the proximity signal through the power reception side transmitter 53 and controls the power reception circuit 52 (DC/DC converter) to control the power reception voltage V2 to a target power reception voltage $V2_{tgt}$. This is because the power transfer efficiency η between the resonators is correlated with the power reception voltage V2. In the present embodiment, the target power reception voltage $V2_{tgt}$ is set to a predetermined voltage value by which the desired power transfer efficiency $\eta_{tgt}$ is obtained.

Note that the method for detecting the approach to an electrified road is not particularly limited. For example, it may be detected based on the current position information of the vehicle 4 and navigation information (driving route) or, if infrastructure installed before the electrified road sends a signal notifying that an electrified road will be passed through to passing vehicles 4, may be detected by receiving that signal.

In this regard, if an abnormality occurs in power transfer from a power transmission apparatus 2 to a power reception apparatus 5, since the power transmission apparatus 2 and the power reception apparatus 5 are physically separated, the dynamic wireless power transfer system 100 has to judge if the cause of the abnormality lies in the power transmission apparatus 2 or if it lies in the power reception apparatus 5. If the abnormality occurs in the power reception apparatus 5, either power transfer will no longer be able to be performed to the electrical load 47 of the vehicle 4 mounting the power reception apparatus 5 in which the abnormality has occurred or, even if able to be performed, the amount of power transfer will decrease compared with normal times. As a result, the operation of the vehicle 4 is liable to be obstructed. For this reason, it is desirable to be able to judge the operating state of the power reception apparatus 5, that is, if the power reception apparatus 5 is normally operating or if an abnormality has occurred in the power reception apparatus 5.

Therefore, in the present embodiment, inspection information relating to inspection dates of the power transmission apparatuses 2 can be collected at the server 1, the elapsed time T from the inspection date of a power transmission apparatus 2 installed at the location of occurrence of an abnormality to the date of occurrence of the abnormality can be calculated based on that inspection information and information on occurrence of an abnormality relating to the location of occurrence of the abnormality and date of occurrence of the abnormality where the real power transfer efficiency ire al calculated based on the received power P2 [W] received by the power reception apparatus 5 while running on an electrified road becomes less than a predetermined value and the operating state of the power reception apparatus 2 can be judged based on that elapsed time T.

Below, control for judgment of the operating state of a power reception apparatus 5 according to this embodiment will be explained.

Figure 3:
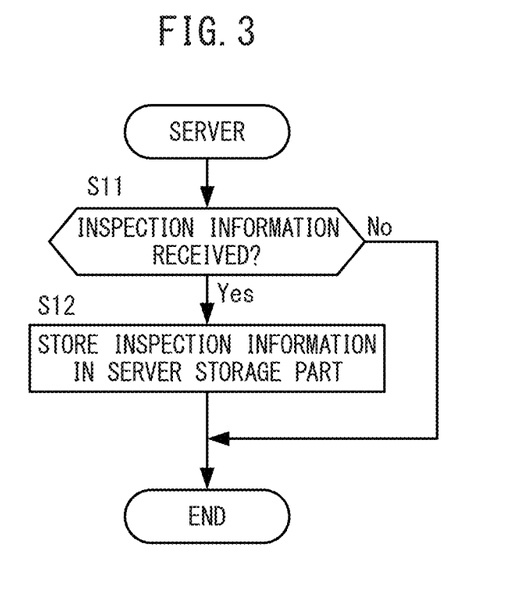
FIG. 3 is a flow chart for explaining the content of processing performed by a server for collecting inspection information relating to dates of inspection of power transmission apparatuses at the server.

FIG. 3 is a flow chart for explaining the content of processing performed at the server for collecting inspection information relating to the inspection dates of power transmission apparatuses 2 at the server 1.

At step S1, the server 1 judges if it has received inspection information relating to the inspection date of a power transmission apparatus 2. The inspection information includes the inspection date of the power transmission apparatus 2 and the installation location of the power transmission apparatus 2 at which inspection (for example, periodic inspection etc.) was performed. The inspection information can for example be sent from a terminal possessed by an inspector to the server 1 each time a power transmission apparatus 2 is inspected. Further, if a power transmission apparatus 2 is configured to be able to communicate with the server 1, the fact that an inspection was performed can be detected by the power transmission apparatus 2 and sent from the power transmission apparatus 2 to the server 1. If receiving the inspection information, the server 1 proceeds to the processing of step S2, while if not receiving it, ends the processing once.

At step S2, the server 1 stores the inspection information received from the power transmission apparatus 2 in the server storage part 12. In this way, the server 1 collects inspection information of the power transmission apparatuses 2.

Figure 4:
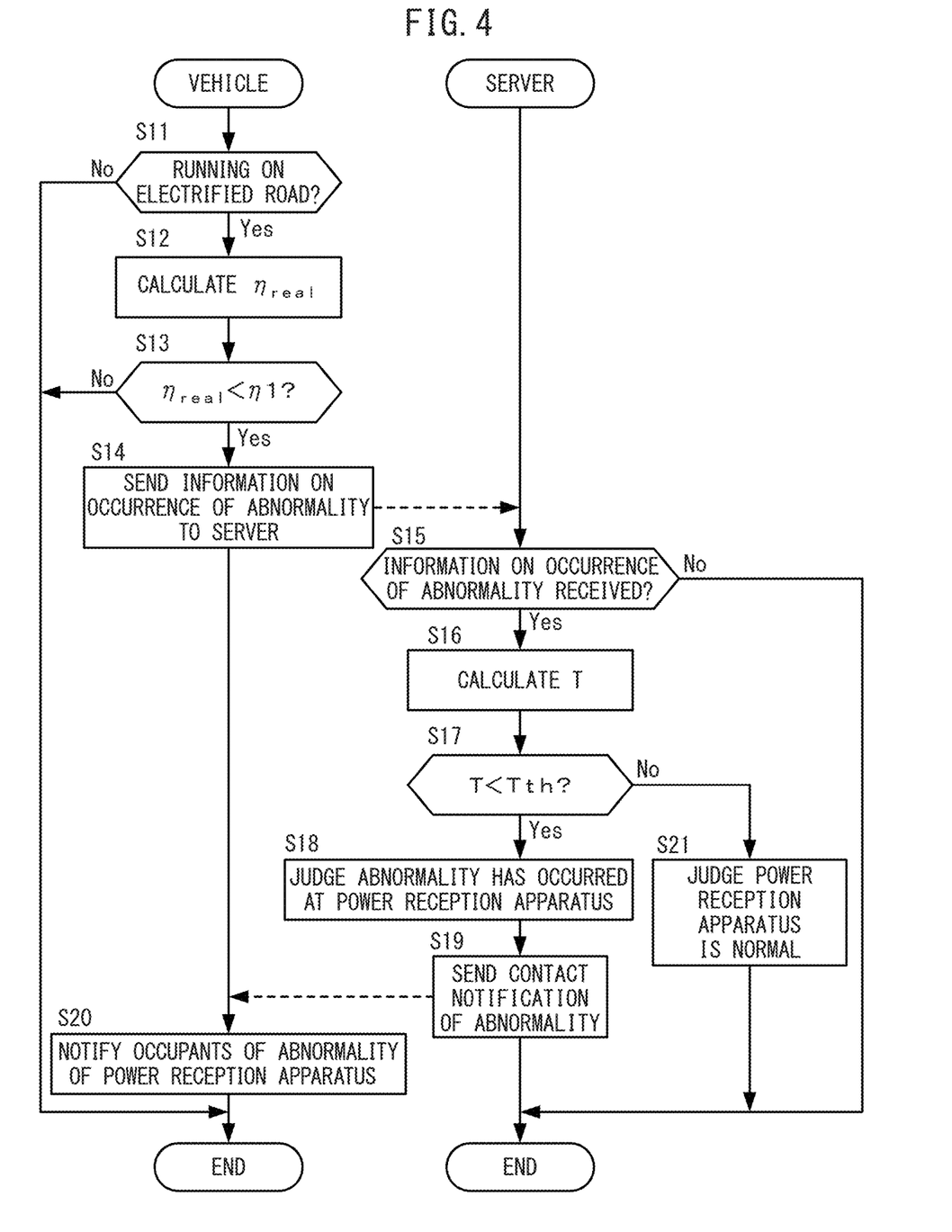
FIG. 4 is a flow chart for explaining the content of processing performed between a vehicle and a server for judging an operating state of a power reception apparatus.

FIG. 4 is a flow chart for explaining the content of processing performed between a vehicle 4 and the server 1 for judging an operating state of a power reception apparatus 5.

At step S11, the vehicle control device 40 of the vehicle 4 judges if a host vehicle is running on an electrified road based on the current position of the host vehicle and map information. If the host vehicle is running on an electrified road, the vehicle control device 40 of the vehicle 4 proceeds to the processing of step S12. On the other hand, if the host vehicle is not running on an electrified road, the vehicle control device 40 of the vehicle 4 ends the current processing.

At step S12, the vehicle control device 40 of the vehicle 4 calculates a received power P2 received by the power reception apparatus 5 based on the received current I2 and the received voltage V2 and divides this by a target transmitted power $P1_{tgt}$ to thereby calculate a power transfer efficiency $\eta_{real}(=P2/P1_{tgt})$ and detect the location (running position) and date of acquiring the received current I2 and received voltage V2 used for calculation of the power transfer efficiency $\eta_{real}$.

Note that, the value of the target transmitted power $P1_{tgt}$ can be acquired by storing values of the target transmitted power $P1_{tgt}$ in the storage parts 402 of the vehicle control devices 40 of the vehicles 4 if, like in the present embodiment, making the values fixed values. Further, for example, in the vehicle control devices 40 of the vehicles 4, if calculating the demanded received power based on the state of the electrical load 47 (for example, if the electrical load 47 is a battery, the battery SOC) and including information relating to the demanded received power in the proximity signal, it is possible to make the demanded received power the target transmitted power $P1_{tgt}$.

At step S13, the vehicle control device 40 of a vehicle 4 judges if the power transfer efficiency $\eta_{real}$ is less than a predetermined value $\eta1$ ($<\eta_{tgt}$), that is, if there is a possibility of power transfer not having been performed normally. If the power transfer efficiency $\eta_{real}$ is less than the predetermined value $\eta1$, the vehicle control device 40 of the vehicle 4 judges that there is a possibility that the power transfer was not normally performed and proceeds to the processing of step S14. On the other hand, if the power transfer efficiency $\eta_{real}$ is greater than or equal to the predetermined value $\eta1$, the vehicle control device 40 of the vehicle 4 ends the current processing.

At step S14, the vehicle control device 40 of the vehicle 4 sends the server 1 information relating to the location and date where the power transfer efficiency $\eta_{real}$ became less than the predetermined value $\eta1$, that is, information relating to the location of occurrence of an abnormality and date of occurrence of the abnormality (below, referred to as the "information on occurrence of an abnormality"). Note that, the information on occurrence of an abnormality also includes identification information of the vehicle 4 sending the information on occurrence of an abnormality (below, referred to as the "transmitting vehicle") so as to enable the server 1 to identify the transmitting vehicle.

At step S15, the server 1 judges if it has received information on occurrence of an abnormality. If receiving information on occurrence of an abnormality, the server 1 proceeds to the processing of step S16. On the other hand, if not receiving information on occurrence of an abnormality, the server 1 ends the processing once.

At step S16, the server 1 calculates an elapsed time T from the inspection date of the power transmission apparatus 2 installed at the location of occurrence of an abnormality to the date of occurrence of the abnormality based on the inspection information stored in the server storage part 12 and the received information on occurrence of an abnormality.

Figure 5:
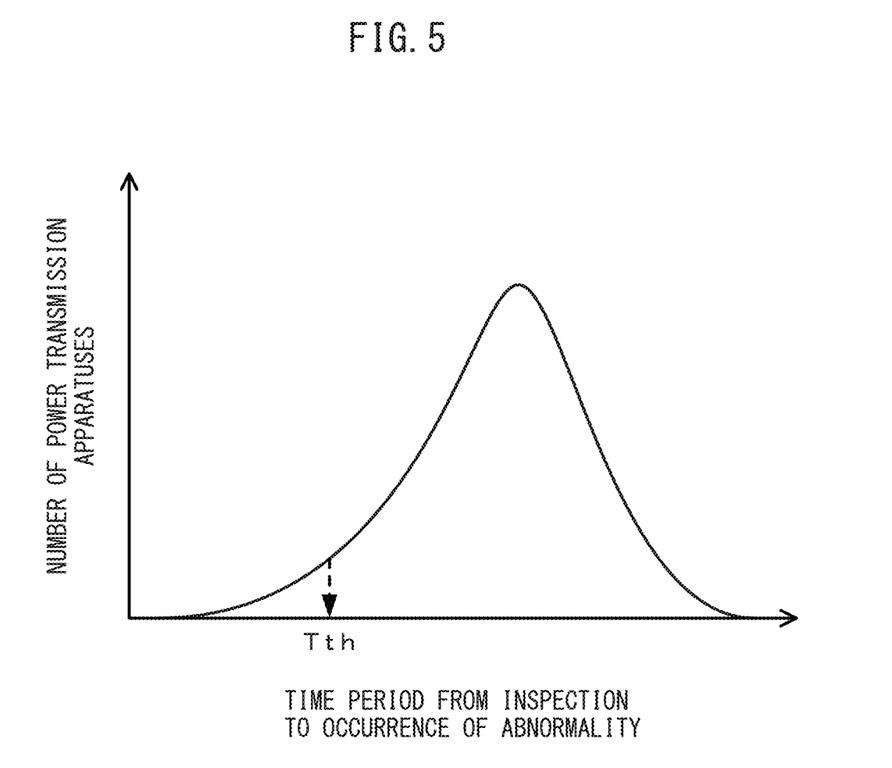
FIG. 5 is a distribution map showing one example of the distribution of the number of power transmission apparatuses for each time period from when a power transmission apparatus is inspected to when an abnormality occurs.

At step 517, the server 1 judges if the elapsed time T is less than a predetermined abnormality judgment threshold value Tth. If the elapsed time T is less than the abnormality judgment threshold value Tth, the server 1 proceeds to the processing of step S18. On the other hand, if the elapsed time T is greater than or equal to the abnormality judgment threshold value Tth, the server 1 proceeds to the processing of step S21. The abnormality judgment threshold value Tth is determined based on statistical data relating to the time periods from when the inspections of power transmission apparatuses 2 were performed to when abnormalities occurred. For example, in the present embodiment, the abnormality judgment threshold value Tth is set to a suitable value based on the distribution map shown in FIG. 5, specifically the distribution of the number of power transmission apparatuses 2 for each of the time periods from when inspections of the power transmission apparatuses 2 were performed to when abnormalities occurred.

At step S18, since the elapsed time T from when inspection of the power transmission apparatus 2 was performed is less than the abnormality judgment threshold value Tth, the server 1 judges that the possibility of the abnormality occurring in the power transmission apparatus 2 is low and judges that the abnormality has occurred in the power reception apparatus 5 of the transmitting vehicle 4 which had sent the information on occurrence of an abnormality.

At step S19, the server 1 sends the transmitting vehicle 4 which had sent information on occurrence of an abnormality a contact notification of abnormality for informing the occurrence of an abnormality at the power reception apparatus 5.

At step S20, if receiving a contact notification of abnormality, the vehicle control device 40 of the vehicle 4 notifies the vehicle occupants of the occurrence of the abnormality at the power reception apparatus 5 of the host vehicle through an HMI device 44.

At step S21, since the elapsed time T from when the inspection of the power transmission apparatus 2 was performed is greater than or equal to the abnormality judgment threshold value Tth, the server 1 judges that the possibility of the abnormality having occurred at the power transmission apparatus 2 is high and judges that the power reception apparatus 5 of the transmitting vehicle 4 which had transmitted information on occurrence of an abnormality is normal. Note that, if the elapsed time T from when the inspection of the power transmission apparatus 2 was performed is greater than or equal to the abnormality judgment threshold value Tth, it is not necessarily required to judge that the power reception apparatus 5 is normal. It is possible to end the processing without particularly judging the operating state of the power reception apparatus 4 or possible to judge occurrence of the abnormality at the power transmission apparatus 2 installed at the location of occurrence of the abnormality.

The server 1 (operating state judgment apparatus) according to the present embodiment explained above is provided with a server processing part 13 (processor), a server communication part 11 (communication devise) able to communicate with a vehicle 4 (mobile object) provided with a power reception apparatus 5 for receiving power wirelessly transmitted from a power transmission apparatus 2 installed on a road, and a server storage part 12 (storage device) for storing inspection information relating to an inspection date of a power transmission apparatus 2. Further, the server processing part 13 is configured to calculate an elapsed time T from the inspection date of the power transmission apparatus 2 installed at the location of occurrence of the abnormality to the date of occurrence of the abnormality based on the inspection information and information on occurrence of an abnormality received from the vehicle 4 through the server communication part 11 relating to the location of occurrence of the abnormality and date of occurrence of the abnormality where the power transfer efficiency $\eta_{real}$ of the power transmission apparatus 2 to the power reception apparatus 5 becomes less than a predetermined value $\eta 1$ and to judge the operating state of the power reception apparatus 5 based on the elapsed time T.

Specifically, the server processing part 13 is configured to judge that the operating state of the power reception apparatus 5 is abnormal if the elapsed time T is less than the abnormality judgment threshold value Tth and to judge that the operating state of the power reception apparatus 5 is normal or to not judge the operating state of the power reception apparatus 5 if the elapsed time T is greater than or equal to the abnormality judgment threshold value Tth.

If an abnormality occurs in the power transfer from a power transmission apparatus 2 to a power reception apparatus 5, during a predetermined time period from the inspection date of the power transmission apparatus 2, there is a high likelihood of the abnormality occurring in the power reception apparatus 5. Therefore, like in the present embodiment, by calculating the elapsed time T from the inspection date of the power transmission apparatus 2 installed at the location of occurrence of the abnormality to the date of occurrence of the abnormality, it is possible to judge the operating state of the power reception apparatus 5 in the case where an abnormality occurs in the power transfer from the power transmission apparatus 2 to the power reception apparatus 5 based on the elapsed time T. That is, if an abnormality occurs in the power transfer from a power transmission apparatus 2 to a power reception apparatus 5, it is possible to judge if the power reception apparatus 5 is operating normally or if an abnormality is occurring in the power reception apparatus 5.

Further, in the present embodiment, the abnormality judgment threshold value Tth is determined based on statistical data relating to the time periods from when power transmission apparatuses 2 were inspected to when abnormalities occurred, so it is possible to compare the elapsed time T with the abnormality judgment threshold value Tth to judge the operating state of a power reception apparatus 5 and thereby accurately judge the operating state of the power reception apparatus 5.

Further, a dynamic wireless power transfer system 100 (wireless power transfer system) according to the present embodiment is provided with a vehicle 4 (mobile object) provided with a power reception apparatus 5 for receiving power wirelessly transmitted from a power transmission apparatus 2 installed at a road and a server 1 in which inspection information relating to the inspection dates of the power transmission apparatuses 2 is stored. The vehicle 4 is configured to detect the location of occurrence of an abnormality and date of occurrence of the abnormality where the power transfer efficiency $\eta_{real}$ from the power transmission apparatus 2 to the power reception apparatus 5 became less than a predetermined value η1 and transmit information relating to the location of occurrence of an abnormality and date of occurrence of the abnormality to the server 1. The server 1 is configured to calculate an elapsed time T from an inspection date of the power transmission apparatus 2 installed at the location of occurrence of an abnormality to the date of occurrence of the abnormality based on the inspection information and the information on occurrence of an abnormality received from the vehicle 4 and to judge the operating state of the power reception apparatus 5 based on the elapsed time T. Due to this, it is possible to judge an operating state of a power reception apparatus 5 in the case where an abnormality occurs in power transfer from a power transmission apparatus 2 to a power reception apparatus 5.

Above, an embodiment of the present disclosure was explained, but the above embodiment only shows part of the examples of application of the present disclosure. It is not meant to limit the technical scope of the present disclosure to the specific configuration of the above embodiment.

For example, in the above embodiment, inspection information relating to inspection dates of the power transmission apparatuses 2 was collected at the server 1, but instead of the inspection dates or together with the inspection dates, information relating to the installation dates at which the power transmission apparatuses 2 were newly installed may also be collected at the server 1. Further, an elapsed time from the installation date of a power transmission apparatus 2 installed at the location of occurrence of an abnormality to the date of occurrence of the abnormality may be calculated and that elapsed time compared with an abnormality judgment threshold value to judge whether a power reception apparatus 2 is abnormal or normal and other operating states of the power reception apparatus 2. The abnormality judgment threshold value in this case is determined based on statistical data relating to the time periods from when power transmission apparatuses 2 were installed on the road to when abnormalities occurred.

Further, in the above embodiment, each power transmission apparatus 2 was provided with a power transmission control device 20, but a single power transmission control device 20 may also be used to control a plurality of power transmission apparatuses 2.

The invention claimed is:

1. An operating state judgment apparatus, comprising:
a processor;
a communication device configured to be able to communicate with a mobile object provided with a power reception apparatus for receiving power wirelessly transmitted from a power transmission apparatus installed on a road; and
a storage device configured to store inspection information relating to inspection dates or installation dates of power transmission apparatuses, wherein
the processor is configured to:
calculate an elapsed time from an inspection date or installation date of a power transmission apparatus installed at a location of occurrence of an abnormality based on the inspection information and information on occurrence of an abnormality relating to the location of occurrence of the abnormality and date of occurrence of the abnormality where the power transfer efficiency from the power transmission apparatus to the power reception apparatus received from the mobile object through the communication device becomes less than a predetermined value;
judge an operating state of the power reception apparatus based on the elapsed time; and
judge that the operating state of the power reception apparatus is abnormal if the elapsed time is less than an abnormality judgment threshold value; and
the abnormality judgment threshold value is determined based on a statistical value relating to time periods from inspection of power transmission apparatuses to occurrence of abnormalities or time periods from installation of the power transmission apparatuses on the road to occurrence of abnormalities.

2. A wireless power transfer system, comprising:
a mobile object provided with a power reception apparatus for receiving power wirelessly transmitted from a power transmission apparatus installed on a road; and
a server in which inspection information relating to inspection dates or installation dates of power transmission apparatuses is stored, wherein
the mobile object is configured to:
detect a location of occurrence of an abnormality and date of occurrence of the abnormality at which a power transfer efficiency from the power transmission apparatus to the power reception apparatus has become less than a predetermined value; and
transmit information relating to the location of occurrence of an abnormality and the date of occurrence of the abnormality to the server, and
the server is configured to:
calculate an elapsed time from the inspection date or installation date of the power transmission apparatus installed at the location of occurrence of the abnormality to the date of occurrence of the abnormality based on the inspection information and information on occurrence of an abnormality received from the mobile object;
judge an operating state of the power reception apparatus based on the elapsed time; and
judge that the operating state of the power reception apparatus is abnormal if the elapsed time is less than an abnormality judgment threshold value; and
the abnormality judgment threshold value is determined based on a statistical value relating to time periods from inspection of power transmission apparatuses to occurrence of abnormalities or time periods from installation of the power transmission apparatuses on the road to occurrence of abnormalities.

3. An operating state judgment apparatus, comprising:
a processor;
a communication device configured to be able to communicate with a mobile object provided with a power reception apparatus for receiving power wirelessly transmitted from a power transmission apparatus installed on a road; and
a storage device configured to store inspection information relating to inspection dates or installation dates of power transmission apparatuses, wherein
the processor is configured to
calculate an elapsed time from an inspection date or installation date of a power transmission apparatus installed at a location of occurrence of an abnormality based on the inspection information and information on occurrence of an abnormality relating to the location of occurrence of the abnormality and date of occurrence of the abnormality where the power transfer efficiency from the power transmission apparatus to the power reception apparatus received from the mobile object through the communication device becomes less than a predetermined value;

judge an operating state of the power reception apparatus based on the elapsed time; and judge that the operating state of the power reception apparatus is normal or not to judge the operating state of the power reception apparatus, if the elapsed time is greater than or equal to an abnormality judgment threshold value; and the abnormality judgment threshold value is determined based on a statistical value relating to time periods from inspection of power transmission apparatuses to occurrence of abnormalities or time periods from installation of the power transmission apparatuses on the road to occurrence of abnormalities.

\* \* \* \* \*